Patented Nov. 6, 1951

2,573,724

UNITED STATES PATENT OFFICE 2,573,724

GAS TURBINE FUEL CONTROL WITH THROTTLE CONTROLLED MANUALLY AND BY FLUID PRESSURE FROM AN ISOCHRONOUS GOVERNOR

Robert A. Neal, Media, Pa., assignor to Westinghouse Electric Corporation, East Pittsburgh, Pa., a corporation of Pennsylvania Application February 25, 1948, Serial No. 10,661

8 Claims. (Cl. 60—39.28)

The invention relates to a gas turbine propulsion plant, more particularly for aircraft, and it has for an object to provide apparatus of that character wherein the fuel is controlled by a manually-operable throttle whose position is governed by means of a speed compensated governor, whereby provision is made for maximum take-off power and for flight operation near the maximum rotative speed without stalling the compressor on account of increase in speed due to decrease in load pursuant to increase in altitude.

A further object of the invention is to provide a fuel system for apparatus of the above character supplied with fuel by means of a pump and wherein the flow is controlled by a throttle subject to manual operation and to control by a speed compensated governor and wherein the fuel itself constitute the liquid medium required for the governing pressure and for all operating pressures.

Another object of the invention is to provide apparatus of the above character wherein the flow of fuel is controlled by a throttle valve constructed and arranged to provide a linear relation to valve position, thereby making it possible to use manual or governor movements without the introduction of mechanical complications because of variable throttle flow characteristics.

Another object of the invention is to provide a fuel throttle valve and a dump valve operating valve operated by a throttle lever such that, with the latter in initial position, the dump valve is in dumping position, and movement of the lever away from initial position first moves the dump valve to nondumping position and then moves the throttle valve in an opening direction for increase in power together with an isochronous or speed-corrected governor controlling the throttle valve so that the speed is held substantially constant regardless of flight speed altitude and ambient air conditions.

A further object of the invention is to provide a fuel throttle valve of the above character operated by a fluid pressure operated servomotor having a spring serving to bias the throttle to closed position together with a valve which is opened as the throttle lever approaches initial position to provide free drainage from the servomotor so that the spring may close the throttle and which is closed incident to movement of the throttle lever away from initial position.

A still further object is to provide a fuel supply and controlling system for a gas turbine wherein the supplied liquid fuel is itself used as the motive medium responsive to controlling effects to control the flow thereof for the production of gaseous motive fluid.

Another object of the invention is to provide a pump discharging liquid fuel used to provide liquid under governor pressure, used to provide motive fluid for varying the flow area of the throttle valve, and used to provide the stream of liquid fuel flowing through the flow area of the throttle valve for generation of gaseous motive fluid to drive the turbine.

The foregoing and other objects are effected by the invention as will be apparent from the following description and claims taken in connection with the accompanying drawings, forming a part of this application, in which:

Figure 1:
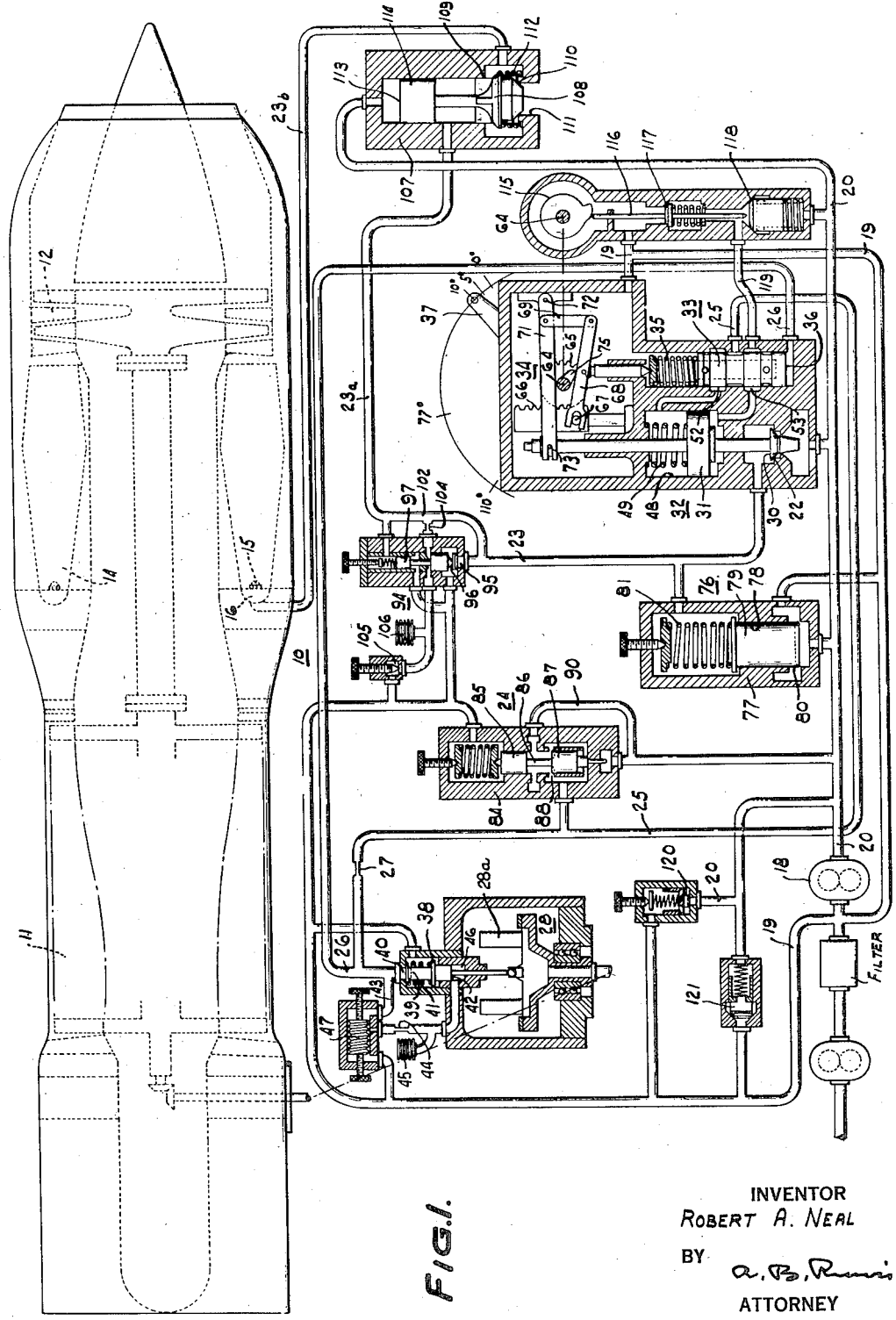
Figure 1 is a diagrammatic view showing the improved fuel control system in relation to an aviation gas turbine plant.

In the drawing, there is shown a gas turbine plant, at 10, comprising a compressor 11 driven by the turbine 12 and which supplies air to the combustion apparatus 14. The combustion apparatus is furnished with liquid fuel by means of the atomizers 15 communicating with the manifold 16, the latter being supplied by means of the improved fuel control system.

Referring to the fuel control system, the gear pump 18 is driven by the turbine and suction and discharge spaces 19 and 20 are associated therewith. Liquid fuel flows from the discharge space through the throttle valve 22 to the delivery passage 23. Also, liquid fuel is supplied from the discharge space 20 through the pressure regulator, at 24, to the regulated pressure passage 25. A governing pressure passage or space 26 is supplied with liquid fuel through the metering orifice 27 from the regulated pressure space 25.

A governor, at 28, is driven by the turbine and it is operative to change the pressure of liquid fuel in the governing pressure space 26 in response to speed change.

The throttle valve 22 includes a movable throttle valve 30 connected to the operating piston 31 of the servomotor, at 32, the latter including a relay 33 and follow-up mechanism comprising linkage, at 34, connected to the operating piston and a spring 35 interposed between the relay and the linkage. The relay has a piston face 36 subject to pressure of liquid fuel in the governing pressure space 26 so that the force of such pressure is in opposed relation to the force of the follow-up spring 35.

The opposed governing pressure and follow-up spring forces acting on the relay are in balanced relation when the latter is in mid-position. It will, therefore, be apparent that any disturbance of equilibrium of these opposed forces will result in movement of the relay to bring about operation of the servomotor to move the throttle valve and thereby change the flow of fuel supplied for combustion until the change in turbine speed operates through the governor to change the governor regulating pressure until the relay is restored to mid-position, that is, the regulating action taking place pursuant to force change acting on the relay brings about change in power of the turbine in such a direction that equilibrium of forces on the relay is restored. It will be apparent that the relay may be operated either by changing the force of the follow-up spring 35, secured by operation of the throttle lever 37, or by a change of pressure of liquid fuel in the governing pressure passage 26, brought about by operation of the governor, at 28.

In order that linear effects of throttle lever adjustment and of governor operation may be used without mechanical complication, the throttle valve 22 is constructed and arranged to provide for a linear relation of flow area to position of the movable valve member. To this end, the differential pressure across the throttle valve is maintained substantially constant so as to secure a linear relation of flow to flow area and the valve travel is limited and the flow area is bounded by simple conical surfaces so that a linear relation of flow area to valve travel is secured. Therefore, by the provision of these two features, there is secured a linear relation of flow area to valve position with the advantages herein indicated.

As shown, the governor includes flyweights 28a rotated by the turbine and centrifugal force thereof is exerted on one end of the transformer relay 38 whose other end is formed as a cup valve 39 in covering relation to the escape port 40 for the governing pressure passage 26. The cup valve 39 presents a pressure area exposed to pressure in the governing pressure space so that the force of such pressure acts on the relay in a direction tending to increase the escape area to decrease the governed pressure, such force being in opposed relation to the centrifugal force tending to diminish the escape area and to increase the governing pressure. A spring 41 acts on the transformer relay in a direction to oppose the centrifugal force, that is, the forces of the spring and of the governed pressure preferably both act in opposed relation to the centrifugal force exerted by the flyweights.

With the governor so far described, to change the governed pressure in the passage 26 would require a change in speed, that is, for movement of the movable throttle valve member 30 over the power range would involve speed droop, a small percentage of speed change or regulation being involved, the speed varying from a maximum to a minimum over the power range. Hence, in normal operation, the governor would have the customary regulation for changes in flight speed and altitude.

If the governor is speed-compensated, the turbine will operate at the same speed regardless of changes in flight speed altitude or ambient air conditions with the result that maximum power may be available for take-off with operation in flight safely near the maximum speed without danger of compressor stalling. To provide for speed correction or compensation of the governor, the transformer relay 38 has a piston face 42 disposed in opposed relation to the piston face of pressure area provided by the cup valve 39 and a passage 43 supplies liquid from the governor pressure passage for action on the piston face 42, the passage having an orifice 44 providing a time lag or delay and an air bell or accumulator 45 communicating with the passage between the orifice and the cylinder space 46 to which the piston face is exposed.

Assuming that the area of the piston face 42 is equal to the cup valve piston area and that the passage 43 is subject to governed pressure change, then, upon change in governing pressure pursuant to speed change, such changing governed pressure is applied with time delay to the piston area 42 to balance gradually the governing pressure, the latter also undergoing further change for this purpose, so that the transformer relay is positioned with the fluid pressure forces acting thereon balanced and with the force of the spring balancing the centrifugal force. Thus, the change in speed is temporary, the governor functioning in response to speed change to bring about further change in governed pressure to restore the speed to a substantially constant value.

As shown, the compensator passage 43 is not in direct and open communication with the governing pressure passage but such communication is afforded by means of the adjustable spiral or viscous orifice device 47, more particularly disclosed and claimed in Bryant Patent No. 2,323,-115, granted June 29, 1943. By means of such an orifice the pressure at the inlet end of the passage 43 may be varied in proportionate relation to the pressure in the governing pressure passage, whereby the percentage of speed correction or compensation may be varied. Preferably, the piston area 42 is made sufficiently larger than the cup valve pressure area that the viscous orifice may be adjusted for under-compensation, full compensation or over-compensation. Adjustment for over-compensation provides for an increased speed where the flight condition calls for an increased flow.

To increase the power, the operator moves the throttle, power, or speed changer lever 37 in a power-increasing direction (counterclockwise in Fig. 1), such movement of the lever acting on the linkage to change the force of the follow-up spring 35, whereupon the servomotor is operated to increase the flow area of the throttle for increase in power and speed until the isochronous or speed-corrected governor operates to restore the relay to mid-position.

As a linear relation exists between throttle flow area and position of the movable throttle valve member as well as between governed liquid pressure and position of such throttle valve member, it will be apparent that the governor will operate to control the throttle valve so that the turbine operates at substantially the same speed for all power settings of the speed changer or throttle lever.

Referring to the servomotor, at 32, in more detail, the operating piston 31 is arranged in the operating cylinder 46 and a spring 49 acts on the operating piston to move the movable throttle valve 30 in a closing direction. The relay 33 is disposed in the relay cylinder 51 having one end open to the suction space 19 and having its other end open to the governing pressure space or passage 26 so that the latter pressure may be applied to the piston face 36.

Figure 3:
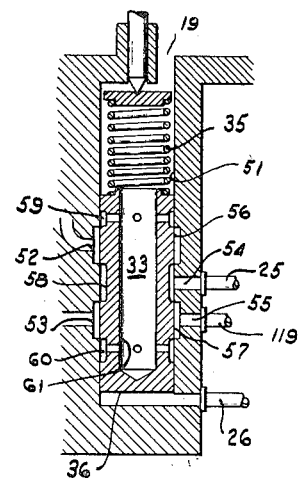
Figure 3 is a detail sectional view of the servomotor relay.

The relay cylinder has a pair of cylinder (Fig. 3) ports 52 and 53, a pressure port 54 arranged between the cylinder ports 52 and 53 and communicating with the regulating pressure passage 25, and a shut-down port 55 communicating with the lower cylinder port 53 and with the hereinafter-described shut-down passage 119 and shut-down valve 118.

The relay includes upper and lower lands 56 and 57 separated by the annular groove 58. Outwardly of the lands 56 and 57 the relay has annular grooves 59 and 60 communicating with the relay axial bore 61 in open communication with the end of the relay cylinder which opens to the suction space 19.

The lands 56 and 57 are so positioned that, with the relay in mid-position, they lap the cylinder ports 52 and 53. Movement of the relay in either direction from mid-position brings about communication of the regulating pressure passage with one of the cylinder ports and communication of the other cylinder port with the suction space by means of one of the annular grooves and the core space of the relay.

In order that the force of the follow-up spring 35 may be changed by movement of the throttle or speed changer lever 37 to change the position of the movable throttle valve member 30 for power change, such lever is operatively connected to a shaft 64 having a pinion 65 thereon which meshes with a rack 66 guided for vertical movement and which has a fulcrum connection 67 with one end of the lever 68 having abutment relation with respect to the spring 35. The other end of the lever 68 is pivotally connected by means of a link 69 to a lever 71, one end of the latter lever being pivotally connected to the fixed fulcrum 72 and its other end being pivotally connected to the operating piston, at 73.

As minimum power would call for minimum flow area of the throttle, the governed pressure should be at a minimum for such power. With the rack about in the position shown in Fig. 1, the spring is at the lower end of its loading range in which the relatively low follow-up spring force is balanced by corresponding force of governed fluid pressure. As the throttle lever 37 is moved counterclockwise from the position shown, the shaft 64 and the pinion 65 are rotated counterclockwise, whereby the force of the follow-up spring 35 and of governed pressure in the governing pressure passage are increased and the movable throttle valve member is moved in opening direction to increase the power, the isochronous or speed-corrected governor operating to maintain the turbine speed substantially constant.

If, for any reason, the throttle valve should fail to be properly operated by the control system, then the throttle or speed changer lever may be given overtravel movement to bring the crank abutment 75 carried by the shaft 64 to engage underneath the lever 71 so that the latter may be lifted against the force of the spring 49 to move the movable throttle valve member 30 in an opening direction, it being apparent that the spring 49 is effective, with clockwise movement of the throttle lever, to move the throttle valve lever in a closing direction.

While any suitable means may be provided to maintain the differential pressure across the throttle valve 32 substantially constant, as shown, there is provided a differential relief construction, at 76, the latter including a housing 77 having an interior cylinder 78 containing a piston 79, one end of the piston being subject to pressure of the delivery passage 23 and the other end being subject to pump discharge pressure and cooperating with an annular port 80 to provide for escape of liquid fuel from the pump discharge space 20. An adjustable load spring 81 exerts force on the piston 79 in the same direction as that exerted by the delivery pressure.

Assuming that the piston 79 is in a position with the forces acting thereon in equilibrium, if there is a change in either upstream or downstream pressure across the throttle, then the piston 79 will move to vary the escape from the pump discharge space to the suction space so as to modify the pump discharge pressure to restore the piston to equilibrium position. If the delivery pressure tends to increase, the effect of increasing force thereof on the piston is to reduce the extent of escape from the pump discharge space, thereby increasing the pressure thereof to restore the differential pressure. On the other hand, if the pump discharge pressure tends to increase relative to the delivery pressure, then such increase is opposed by movement of the piston 79 to increase the escape area, whereby change in differential pressure is opposed.

The differential pressure regulator, at 24, for supplying liquid fuel from the pump discharge space 20 to the regulated pressure passage 25 includes a housing 84 having a piston structure 85 therein. The piston structure has spaced upper and lower piston portions 86 and 87, the upper end of the lower piston portion cooperating with a port 88 which communicates with the regulating pressure passage 25. Liquid fuel under pump discharge pressure is supplied by the branch line 90 to the space between the piston portions. The upper end of the upper piston portion 86 has an adjustable load spring 91 bearing thereon and the lower piston portion has the bottom piston face 92 subject to regulated pressure. The lower piston face 92 is, therefore, sensitive to regulated pressure change, a decrease in regulated passage pressure resulting in downward movement of the piston structure by the load spring to increase the area of the port 88 to increase the regulated pressure. On the other hand, if the regulated pressure should tend to increase the contrary action would take place, the piston structure moving upwardly to restrict the flow from the pump discharge passage to the regulated pressure passage.

Because of wide pressure changes occurring in the pump discharge passage and the desirability of maintaining a simple structural relation of port area and the structure for varying such area, there is provided a small compensator in the form of a pin 93 whose lower end provides a small piston face exposed to pump discharge pressure, changing discharge pressure acting in conjunction with the spring, so that, with increase in discharge pressure, there is provided an increase in force acting, with the regulated pressure force, to move the piston structure against the load spring and in a direction to diminish the port area. On the other hand, with rapidly diminishing pump discharge pressure, the contrary action takes place, the force exerted on the lower end of the pin 93 being rapidly diminished permitting of the load spring 91 moving the piston structure in correspondence to such diminishing force so as to increase the port flow area from the pump discharge space to the regulated pressure passage.

To avoid overheating of the plant due to too rapid increase of delivery pressure, there is provided, at 94, an acceleration control which is operative to limit the rate of increase of such pressure. The acceleration control comprises an escape port 95 for the delivery passage 23 and which is covered by the cup valve 96 subject to force of delivery pressure tending to open it to reduce the delivery pressure.

Figure 5:
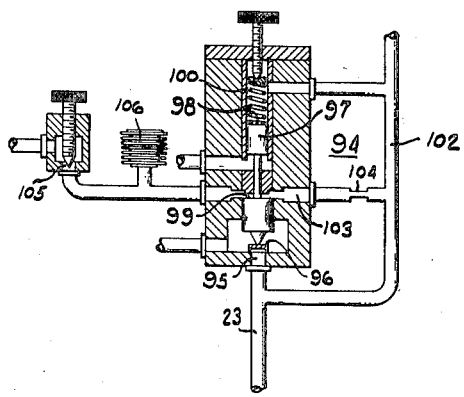
Figure 5 is a detail sectional view of the acceleration control.
Figure 4:
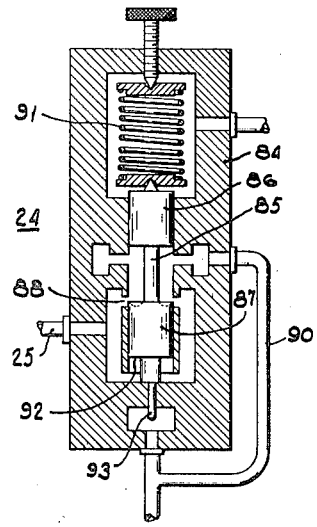
Figure 4 is a detail sectional view of the pressure regulator.

Opening force of the cup valve is opposed by closing forces exerted on the piston structure 97 by fluid pressures applied to the piston areas 98 and 99 (Fig. 5) of the piston structure and by the spring 100.

Fluid under delivery pressure is supplied by the passage 102 for action on the piston areas 98. Change in pressure acting on the piston area 98 is accompanied by delayed change in pressure acting on the piston area 99; and, to provide for delayed pressure change for the latter piston area, there is provided a space 103 to which the piston area 99 is exposed, such space being supplied with liquid fuel from the delivery passage through the orifice 104 and liquid fuel escaping from the space through the adjustable needle valve orifice 105.

By adjustment of the spring 100 and the orifice 105, desired operation and responsiveness of the acceleration control may be secured. Normally, the acceleration control closing forces keep the cup valve closed; however, as the rate of delivery pressure of liquid fuel is increased, a point is reached where the closing force exerted on the piston area 99 does not increase fast enough to keep the cup valve closed, whereupon the latter opens to relieve the delivery pressure and, therefore, limit the rate at which such pressure increases. Preferably, the pressure space 103 is provided with an air bell or accumulator 106.

The delivery passage 23 includes a first section 23a connected by dump valve 107 to a second section 23b arranged to discharge liquid fuel to the atomizer manifold 16. The dump valve includes a valve member 108 movable to dumping position where it cooperates with the seat 109 to close the discharge end of the first section 23a of the delivery passage and to move away from the seat 110 so that the second section 23b of delivery passage and the manifold communicate with the dump opening 111.

The movable valve member of the dump valve is normally maintained in position, against the force of a biasing spring 112, to connect the first and second sections of the delivery passage and to close the dump opening by means of pump discharge pressure applied to a piston area 113 provided by a piston 114 connected to the movable valve member 108, the spring operating to move the movable valve member to dumping position upon decline of pump discharge pressure to a predetermined point.

In addition to the throttle lever 37 and its shaft 64 being operative in the manner already described to control the servo-motor, at 32, to effect manual control of the throttle valve, such shaft 64 also has provided thereon a cam 115 which engages a push rod 116 to open the shut down valve 117 and the dump valve operating valve 118 as the throttle lever 37 approaches and is in its initial position, the push rod being connected to the valve 117 and having lost motion with respect to the valve 118 so that the shut down valve is opened first followed by opening of the dump valve operating valve. On the other hand, during the initial portion of throttle lever movement, the dump valve operating valve closes first in order that the dump valve may be moved to close the dump opening and immediately thereafter the shut down valve is closed.

When the shut down valve 117 opens, the shut down port 55 communicates, through the shut down passage 119, with the suction space, whereby the space below the operating piston 31 is in free and open communication with the drain or suction space to permit of unimpeded downward movement of the operating piston to close the throttle valve under the influence of the spring 49. Upon opening of the dump valve operating valve 118 the by-pass passage thereby provided from the pump discharge space 20 to the suction space 19 is effective quickly to lower the pump discharge pressure so that the spring 112 may move the dump valve to dumping position for drainage of liquid fuel from the manifold and the second section of the delivery passage.

While the pressure in the discharge space 20 involves variation over a substantial range in normal operation, it is protected against excessive pressures by means of a maximum pressure relief valve 120, which, upon attainment of sufficient pump discharge pressure opens to relieve such pressure to the suction space of the pump.

On the other hand, protection of the apparatus against a possibility of pressure in the pump discharge space 20 ever being lower than that in the suction space is guarded against by the provision of the by-pass valve 121 arranged to open to provide for flow from the suction space to the discharge space when the suction pressure is higher than the discharge pressure.

Figure 2:
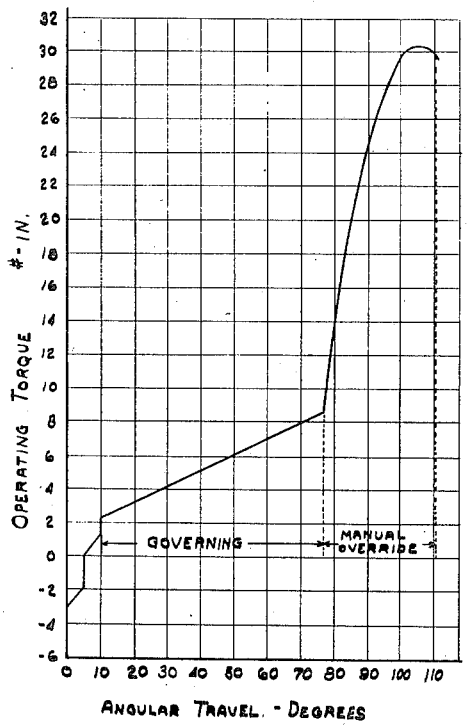
Figure 2 is a graph showing the relationship of operations to angular position of the throttle lever.

The improved fuel control system operates as follows: With the throttle lever 37 in its initial position as indicated at 0° in Fig. 2, the first 5° of movement thereof brings about closing of the dump valve operating valve and during the next 5° the shut down valve is closed, the governing range occurring from about the 10° position to about the 77° position. As the throttle lever is moved from its initial position, the linkage, at 34, is therefore operated to increase the loading of the spring 35 to provide for opening movement of the throttle valve movable valve member 30 to increase the speed and power. Any tendency of the turbine speed to change on account of manual control of the throttle valve is opposed by operation of the speed-responsive governor. Assuming that the throttle lever is moved to a given power position and that the power is developed with incidental change of speed of the turbine, then such speed change is effective to bring about further movement of the servo-motor to adjust the throttle so that the power is developed with the speed restored to its original value. In connection with manual and isochronous governor control of the throttle valve, the provision for a linear relation of flow area to throttle valve position, makes it possible to use simple motions of the throttle lever and of the governor without mechanical complications to position the movable throttle valve member.

As the altitude of operation of the propulsion plant is increased, the fuel rate is decreased by governor operation, whereby increase in speed, due to decrease in load because of increase in altitude, is avoided. Assuming that the turbine is operating at some altitude and is then taken to a higher altitude, since the governor is only sensitive to speed, the speed must increase for operation of the governor to restrict the throttle valve to operate at the new altitude. This increase in turbine speed causes an increase in centrifugal force of the governor weights, thereby causing the transformer cup valve to be moved nearer to its seat to increase the governing pressure, such increase continuing until the increased pressure acting on the cup valve is sufficient to balance the increased centrifugal force of the governor weights. The increased governing pressure thus established by the cup valve has, at the same time, increased the upward force under the servo-motor relay. This causes the relay to move upward admitting high-pressure fuel to the space over the operating piston which moves the latter downwardly closing the throttle valve, the downward movement of the operating piston acting through the follow-up linkage to increase the compression of the follow-up or relay spring until the increased governing pressure underneath the relay is balanced with the relay returned to its neutral position.

To provide for operation of the plant safely near the maximum speed without danger of stalling, provision is made for speed-corrected or compensated operation of the governor. Assuming that the speed temporarily increases slightly due to the regulation of the governor, to bring the speed back to its original value, the governing pressure is admitted under the cup valve through the spiral orifice and time lag orifice to supply an upward force acting on the cup valve. The cup valve moves upward to increase further the governing pressure, such increase in governing pressure moving the relay upward to admit high-pressure fuel above the piston to move the throttle valve further in a closing direction. The follow-up linkage increases the compression on the relay or follow-up spring until the increased governing pressure is balanced and the relay is again returned to its neutral position. The turbine speed has now returned to its original value or some speed slightly above or below depending upon the amount of compensation desired, the amount of compensation obtained being adjusted by properly positioning the spiral orifice.

Assuming that the altitude is decreased, the operation of the governor is the same except that the aforesaid-mentioned forces are reversed, the throttle valve moving in an opening direction instead of a closing direction.

Should the governing system become inoperative, it is possible, by moving the throttle or power lever to the manual override range to move the throttle valve manually, manual effort applied to the lever being opposed by the spring 49.

If the throttle lever should be moved so rapidly that the increase in delivery pressure would cause overheating of the turbine, protection is afforded by the acceleration control device, the latter coming into play in response to a predetermined rate of increase of delivery pressure to relieve such pressure and thereby limit the rate at which the delivery pressure may increase.

An isochronous or speed-corrected governor is peculiarly suitable for the fuel control system for the reason that, with movement of the throttle lever and consequent movement of the movable throttle valve member the governor operates in response to temporary change in speed to adjust the throttle valve to restore the speed. As the speed is kept constant irrespective of adjustment of the control lever and changes in altitude, the apparatus provides for adequate take-off power and for normal operation near the maximum speed without stalling the compressor and without excessive operating temperatures.

A reliable source of substantially uniform pressure is desirable for the orifice 27 and for operation of the servomotor, and the pressure regulator, at 24, serves this purpose, it being supplied with liquid fuel from the pump discharge space and operating to maintain a predetermined pressure in the regulated pressure space.

From the foregoing, it will be apparent that I provide a fuel system for a jet propulsion plant which is capable of control for maximum power for take-off and which is, at the same time, capable of flight operation safely near the maximum speed without stalling the compressor. These results follow from manual operation of the throttle coupled with speed-compensated control of position thereof. Further, the fuel itself is used to provide all of the controlling and operating pressures required.

While the invention has been shown in but one form, it will be obvious to those skilled in the art that it is not so limited, but is susceptible of various changes and modifications without departing from the spirit thereof.

What is claimed is:

1. In an aircraft propulsion plant wherein a compressor driven by a turbine delivers air to support combustion of fuel and to admix with the products of combustion to form gaseous motive fluid for driving the turbine, a fuel pump having a discharge passage, a passage for delivering fuel for combustion, a throttle valve through which liquid fuel flows from the discharge passage to the delivery passage and including a movable throttle valve member, a spring for biasing the throttle valve member in a closing direction, a governing system including an isochronous governor driven by the turbine for controlling the position of the throttle valve member, means including a throttle lever for changing the governed position of the throttle valve member for changing fuel flow and power of the turbine with the latter operating substantially at constant speed, and means responsive to overtravel of the throttle lever in a power-increasing direction to move the throttle valve member against the force of the spring in the event of failure of the governing system.

2. In an aircraft propulsion plant wherein a compressor driven by a turbine delivers air to support combustion of fuel and to admix with the products of combustion to form gaseous motive fluid for driving the turbine, a fuel pump having a discharge passage; a passage for delivering fuel for combustion; a governing fluid pressure passage; a throttle valve through which liquid fuel flows from the discharge passage to the delivery passage and including a movable throttle valve member; means cooperating with the throttle valve to maintain a linear relation of flow therethrough to position of the movable throttle valve member; a servomotor including an operating cylinder, an operating piston in the cylinder and connected to said throttle valve member, a spring acting on the operating piston to bias the throttle valve member in a closing direction, a relay movable from midposition in opposite directions to control the admission of motive fluid to and the exhaust thereof from the operating cylinder to move the operating piston in opposite directions, said relay having a piston face exposed to governing fluid pressure existing in said governing fluid pressure passage, and follow-up mechanism including linkage connected to the operating piston and a spring interposed between the linkage and the relay so that its force acts on the relay in opposed relation to the force of governing pressure acting thereon; a governor driven by the turbine and operative to provide governing fluid pressure in the governing fluid pressure passage which bears proportionate relation to position of the movable throttle valve member throughout the power range; means including a throttle lever for moving the linkage to change the follow-up spring force for operation of the servomotor to change the position of the throttle valve member; and means responsive to overtravel of the throttle valve in a power-increasing direction to move the throttle valve member against the force of said biasing spring in the event of failure of governor controlled operation of the servomotor.

3. In an aircraft propulsion plant wherein a compressor driven by a turbine delivers air to support combustion of fuel and to admix with the products of combustion to form gaseous motive fluid for driving the turbine, a fuel pump, a pump discharge passage, a passage for delivering fuel for combustion, a throttle valve through which liquid fuel flows from the discharge passage to the delivery passage and including a movable throttle valve member, said throttle valve being constructed to provide a linear relation of flow area to travel of its movable valve member, means responsive to discharge and delivery passage pressures for by-passing liquid fuel from the discharge passage so as to maintain the pressure differential across the throttle valve substantially constant to maintain a linear relation of flow therethrough to flow area, a governor driven by the turbine and controlling the position of the movable throttle valve member in response to speed, means responsive to change in speed of the turbine to operate the governor to change the position of the movable throttle valve member to effect further change in position of the movable valve member to compensate for the speed change, means responsive to increase in delivery passage pressure to by-pass liquid fuel therefrom so as to limit the rate at which pressure and therefore flow therein increase, and means including a throttle lever for changing the governed position of the movable throttle valve member.

4. In an aircraft propulsion plant wherein a compressor driven by a turbine delivers air to support combustion of fuel and to admix with the products of combustion to form gaseous motive fluid for driving the turbine, a fuel pump; a pump discharge passage; a passage for delivering liquid fuel for combustion; a regulated pressure passage; a pressure regulator supplied with liquid fuel by the delivery passage and supplying liquid fuel under regulated pressure to the regulated pressure passage; a throttle valve between the discharge and delivery passages and including a movable throttle valve member; said throttle valve having a linear relation of flow area to travel of its movable valve member; means subject to discharge and delivery passage pressures and operative to by-pass liquid fuel from the discharge passage so as to maintain a predetermined pressure differential across the throttle valve to provide a linear relation of flow to flow area; a governing and power controlling system including an operating piston connected to the movable throttle valve member to operate the latter, a spring acting on the operating piston in the direction for closing the throttle valve, a pilot valve movable from mid position to supply liquid fuel from the regulated pressure passage to the side of the operating piston for moving the latter to move the movable throttle valve in an opening direction against the force of such spring and to the other side of the operating piston to act with the spring to move the movable throttle valve member in a closing direction, follow-up mechanism operatively connecting the pilot valve and the operating piston and including a spring, a throttle lever movably manually and acting on the spring for operation of the operating piston to change the throttle valve flow area and fuel flow to change the power developed by the turbine, a governor driven by the prime mover and operative to provide liquid under governing pressure dependent upon prime mover speed, means for supplying liquid under governed pressure to the pilot valve to exert force thereon in opposition to that of said follow-up spring so that change in turbine power is effected with deviation in turbine speed, and means responsive to turbine speed deviation for the change in power to effect further change in governing pressure to restore the turbine speed to its original value; and apparatus for controlling said movable throttle valve member manually in the event of failure of the governing system comprising said spring for biasing the throttle valve member in a closing direction and means responsive to overtravel of the throttle lever in a power-increasing direction for moving the throttle valve member in an opening direction against the force of said spring.

5. In an aircraft propulsion plant wherein a compressor driven by a turbine delivers air to support combustion of fuel and to admix with the products of combustion to form gaseous motive fluid for driving the turbine, a fuel pump; means providing pump suction and discharge spaces and a governing pressure space; a regulated pressure passage; a delivery passage for delivering liquid fuel for combustion; a pressure regulator for supplying fuel from the discharge space to the regulated pressure passage; a metering orifice for supplying liquid fuel from the regulated pressure passage to the governing pressure space; an isochronous governor driven by the turbine and operative to maintain liquid under governing pressure in the governing pressure space; a throttle valve connecting the pump discharge space and the delivery passage and including a movable valve member; means providing for a linear relation as between flow through the throttle valve and the position of the movable valve member thereof; a servomotor including an operating cylinder, an operating piston in the operating cylinder and connected to the movable valve member of the throttle valve, a spring acting on the operating piston in a direction to close the throttle valve, a relay including a piston movable to control the admission of liquid under regulated pressure to either end of the operating cylinder and the exhaust of liquid from the other end thereof to said suction space, and follow-up mechanism including a linkage operatively connected to the operating piston and a spring interposed between the linkage and the relay piston; means for positioning the relay piston comprising a pressure area formed thereon and exposed to governing pressure so that the force of the latter opposes the follow-up spring; and a lever operable manually to move the linkage to adjust the follow-up spring to operate the servomotor to vary the fuel flow to vary the power of the turbine.

6. In an aircraft propulsion plant wherein a compressor driven by a turbine delivers air to support combustion of fuel and to admix with the products of combustion to form gaseous motive fluid for driving the turbine, a fuel pump; means providing pump suction and discharge spaces and a governing pressure space; a regulated pressure passage; a delivery passage for delivering liquid fuel for combustion; a pressure regulator for supplying fuel from the discharge space to the regulated pressure passage; a metering orifice for supplying liquid fuel from the regulated pressure passage to the governing pressure space; an isochronous governor driven by the turbine and operative to maintain liquid under governing pressure in the governing pressure space; a throttle valve connecting the pump discharge space and the delivery passage and including a movable valve member; means providing for a linear relation as between flow through the throttle valve and the position of the movable valve member thereof; a servomotor including an operating cylinder, an operating piston in the operating cylinder and connected to the movable valve member of the throttle valve, a spring acting on the operating piston in a direction to close the throttle valve, a relay including a piston movable to control the admission of liquid under regulated pressure to either end of the operating cylinder and the exhaust of liquid from the other end thereof to said suction space, and follow-up mechanism including a linkage operatively connected to the operating piston and a spring interposed between the linkage and the relay piston; means for positioning the relay piston comprising a pressure area formed thereon and exposed to governing pressure so that the force of the latter opposes the follow-up spring; a lever operable manually to move the linkage to adjust the follow-up spring to operate the servomotor to vary the fuel flow to vary the power of the turbine; a dump valve interposed in the delivery passage so as to divide the latter into upstream and downstream sections and provided with a dump opening; said dump valve including a valve member movable to a first position placing the up and downstream delivery passage sections in communication and closing the dump opening and movable to a second position closing the discharge end of said upstream delivery section and placing the inlet end of said downstream delivery passage section in communication with the dump opening; means for biasing the dump valve movable valve member to said second position; means responsive to pump discharge pressure for normally holding the dump valve movable valve member in said first position against the force of said biasing means; and normally-closed valve means opened by said lever when the latter is at and near to its initial position to relieve the pressure in said pump discharge space to provide for said biasing means moving the dump valve movable valve member to dumping position.

7. In an aircraft propulsion plant wherein a compressor driven by a turbine delivers air to support combustion of fuel and to admix with the products of combustion to form gaseous motive fluid for driving the turbine, a fuel pump; means providing pump suction and discharge spaces and a governing pressure space; a regulated pressure passage; a delivery passage for delivering liquid fuel for combustion; a pressure regulator for supplying fuel from the discharge space to the regulated pressure passage; a metering orifice for supplying liquid fuel from the regulated pressure passage to the governing pressure space; an isochronous governor driven by the turbine and operative to maintain liquid under governing pressure in the governing pressure space; a throttle valve connecting the pump discharge space and the delivery passage and including a movable valve member; means providing for a linear relation as between flow through the throttle valve and the position of the movable valve member thereof; a servomotor including an operating cylinder, an operating piston in the operating cylinder and connected to the movable valve member of the throttle valve, a spring acting on the operating piston in a direction to close the throttle valve, a relay including a piston movable to control the admission of liquid under regulated pressure to either end of the operating cylinder and the exhaust of liquid from the other end thereof to said suction space, and follow-up mechanism including a linkage operatively connected to the operating piston and a spring interposed between the linkage and the relay piston; means for positioning the relay piston comprising a pressure area formed thereon and exposed to governing pressure so that the force of the latter opposes the follow-up spring; a lever operable manually to move the linkage to adjust the follow-up spring to operate the servomotor to vary the fuel flow to vary the power of the turbine; a dump valve interposed in the delivery passage so as to divide the latter into upstream and downstream sections and provided with a dump opening; said dump valve including a valve member movable to a first position placing the up and downstream delivery passage sections in communication and closing the dump opening and movable to a second position closing the discharge end of said upstream delivery passage section and placing the inlet end of said downstream delivery passage section in communication with the dump opening; means for biasing the dump valve movable valve member to said second position; means responsive to pump discharge pressure for normally holding the dump valve movable valve member in said first position against the force of said biasing means; a shut-down passage communicating with the lower end of the operating cylinder; a first valve for said shut-down passage and including means for biasing it to close said passage; a second valve including means for biasing it to closed position and operative, when open, to relieve the pressure in said pump discharge space; and means for operatively connecting said first and second valves to said lever so that, as said lever approaches its initial position, said first valve is first opened followed by opening of the second valve and so that, with the lever in initial position and both the first and second valves opened, the second valve is first closed followed by a closing of the first valve as the lever is moved from its initial position.

8. In a liquid fuel supply system for a prime mover, a positive displacement liquid fuel pump; a discharge passage for the pump; a passage for delivering liquid fuel to the prime mover; a regulated pressure passage; a pressure regulator furnished with liquid fuel from the discharge passage and supplying such liquid fuel to the regulated pressure passage so as to maintain the pressure therein constant; a throttle valve through which liquid fuel flows from the discharge passage to the delivery passage and including a movable throttle valve member; a differential pressure relief valve responsive to discharge passage and delivery passage pressures for by-passing liquid fuel from the pump discharge passage to maintain the differential pressure across the the throttle valve substantially constant; a servo-motor cylinder; a servo-motor piston in the cylinder and connected to the movable throttle valve member; a spring acting on the servo-motor piston in a direction to move the throttle valve member in a closing direction, a relay including a piston movable to control the admission of liquid under regulated pressure to either end of the operating cylinder and the exhaust of liquid from either end thereof to said suction space; follow-up mechanism operatively connecting the relay and servo-motor pistons and including a first lever having one end pivotally connected to the servo-motor piston, a fixed fulcrum for the other end of the lever, a second lever, pivotal means connecting one end of the second lever to the first lever, a movable fulcrum for the other end of the second lever, a spring having its inner end engaging the adjacent end of the relay piston, and an abutment pivotally connected to the second lever between the ends of the latter and engaging the outer end of the spring; a governing system comprising a governing pressure passage, a metering orifice for supplying liquid fuel from the regulated pressure passage to the governing pressure passage, and means responsive to speed of the prime mover and cooperating with the governing pressure passage to provide for variation in liquid fuel pressure therein dependent upon speed; a speed compensator for the governing system comprising means providing a compensating pressure which bears proportional relation to the governing pressure, means for causing the change in compensating pressure to lag with respect to the change in governing pressure due to speed change and means responsive to the lagging compensating pressure to effect further change in governing pressure for speed compensation; means for applying liquid under governing pressure to the relay piston to exert force thereon in opposition to that exerted thereon by the follow-up spring; means responsive to increase in delivery passage pressure to by-pass liquid fuel from such passage to limit the rate at which such pressure increases and therefore the rate at which flow in the delivery passage increases; said delivery passage including first and second sections; a dump valve having a dump opening and movable to one position to close the dump opening and to connect the delivery passage sections and movable to a second position to close the first section and to place the second section in communication with the dump opening; means for moving the dump valve including a spring for biasing it to said second position and a piston area subject to pump delivery pressure for moving the dump valve against the spring to said first position; a shut-down valve normally closing an escape passage for the lower end of the servo-motor cylinder and operable to provide for escape of liquid fuel from the lower portion of the servo-motor cylinder, thereby enabling the servo-motor spring to close the throttle; a dump valve operating valve normally closed and operable to relieve pressure in said pump discharge passage thereby enabling the dump valve spring to move the dump valve to interrupt communication of the delivery passage sections and to place the second section thereof in communication with the dump opening; a throttle lever; and means operated by the throttle lever so that, for its first zone of movement, movement in one direction first closes the dump valve operating valve and then closes the shut-down valve and movement in the other direction first opens the shutdown valve and then opens the dump operating valve, so that, for its second zone of movement, the movable fulcrum is moved to change the setting of the follow-up spring and consequently the governed position of the movable throttle valve member and, for its third zone of movement, it acts directly on the first lever and in conjunction with the servo-motor spring to position the movable throttle valve member.

ROBERT A. NEAL.

REFERENCES CITED

The following references are of record in the file of this patent:

UNITED STATES PATENTS

| Number | Name | Date |
|---|---|---|
| 2,081,188 | Walker | May 25, 1937 |
| 2,095,991 | Lysholm | Oct. 19, 1937 |
| 2,219,994 | Jung | Oct. 29, 1940 |
| 2,239,602 | Gottlieb | Apr. 22, 1941 |
| 2,245,561 | Becker | June 17, 1941 |
| 2,336,052 | Anderson | Dec. 7, 1943 |
| 2,405,888 | Holley | Aug. 13, 1946 |
| 2,422,808 | Stokes | June 24, 1947 |
| 2,457,595 | Orr | Dec. 28, 1948 |
| 2,508,260 | Holley | May 16, 1950 |